(12) United States Patent
Doxey et al.

(10) Patent No.: US 6,908,137 B2
(45) Date of Patent: Jun. 21, 2005

(54) TWO WAY POSITIVE LOCKING LATCH

(75) Inventors: Kyle Doxey, Ann Arbor, MI (US); Changwei Xie, Novi, MI (US); Shawn Brewer, Pickney, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 10/689,782

(22) Filed: Oct. 21, 2003

(65) Prior Publication Data
US 2005/0082865 A1  Apr. 21, 2005

(51) Int. Cl.$^7$ ............................................. B60N 2/20
(52) U.S. Cl. ..................... 296/65.16; 292/56; 292/216
(58) Field of Search ................... 296/65.16; 292/216, 292/56

(56) References Cited

U.S. PATENT DOCUMENTS

| 4,783,103 | A | * | 11/1988 | Schlegel | 292/216 |
|---|---|---|---|---|---|
| 5,007,680 | A | | 4/1991 | Miyauchi et al. | 297/379 |
| 5,106,134 | A | | 4/1992 | Thau | 292/216 |
| 5,125,698 | A | | 6/1992 | Thau | 292/216 |
| 5,209,531 | A | | 5/1993 | Thau | 292/216 |
| 5,474,339 | A | | 12/1995 | Johnson | 292/216 |
| 5,577,782 | A | | 11/1996 | Johnson | 292/216 |
| 5,603,550 | A | | 2/1997 | Holdampf et al. | 297/238 |
| 5,662,337 | A | | 9/1997 | Surbrook | 277/235 B |
| 6,076,890 | A | | 6/2000 | Yoshida et al. | 297/378.12 |
| 6,161,899 | A | | 12/2000 | Yu | 297/378.12 |
| 6,164,712 | A | | 12/2000 | Ajisaka et al. | 296/65.03 |
| 6,199,953 | B1 | | 3/2001 | Chen | 297/367 |
| 6,279,972 | B1 | * | 8/2001 | Brill et al. | 292/216 |
| 6,290,297 | B1 | | 9/2001 | Yu | 297/378.12 |
| 6,332,647 | B1 | | 12/2001 | Yoshida et al. | 297/238 |
| 6,345,867 | B1 | | 2/2002 | Hellrung et al. | 297/336 |
| 6,349,983 | B1 | | 2/2002 | Dupont et al. | 292/201 |
| 6,412,849 | B1 | | 7/2002 | Fast | 296/65.03 |
| 6,435,616 | B1 | | 8/2002 | Travis et al. | 297/378.12 |
| 6,454,355 | B2 | | 9/2002 | Biletskiy | 297/378.12 |
| 6,502,903 | B2 | | 1/2003 | Bruck et al. | 297/378.11 |

(Continued)

FOREIGN PATENT DOCUMENTS

DE     42 19 429 C1   11/1993

(Continued)

OTHER PUBLICATIONS

Copy of the Patent Treaty (PCT) International Search Report, bades on PCT/US2004/032641, (4 pages).

Primary Examiner—Dennis H. Pedder
(74) Attorney, Agent, or Firm—Foley & Lardner LLP

(57) ABSTRACT

A latch for use in a vehicle having a rear seat with a fold down seatback. The latch comprises a striker member coupled to the vehicle and a latch assembly coupled to the seatback and configured to releasably engage the striker member. The latch assembly comprises a catch plate configured with two prongs and pivotably mounted on a support plate. A hook plate with two camming surfaces is configured to engage at least one of the prongs with the hook plate pivotably mounted on the support plate. The movement of the engaged prong is restricted in any direction when the hook plate is in a locked position.

12 Claims, 5 Drawing Sheets

U.S. PATENT DOCUMENTS

| | | | |
|---|---|---|---|
| 6,547,291 B1 * | 4/2003 | Schwaiger | 292/216 |
| 6,547,302 B1 * | 4/2003 | Rubio et al. | 296/65.09 |
| 6,511,129 B1 | 1/2003 | Minor et al. | 297/367 |
| 6,527,315 B2 | 3/2003 | Marks et al. | 292/341.15 |

FOREIGN PATENT DOCUMENTS

| | | |
|---|---|---|
| DE | 100 01 659 A1 | 7/2000 |
| DE | 101 59 533 A1 | 6/2003 |

* cited by examiner

TWO WAY POSITIVE LOCKING LATCH

BACKGROUND OF THE INVENTION

The present invention relates generally to the field of latches for use in vehicle seats and more particularly relates to a vehicle seat and a seatback latch.

It is well known in the art to provide folding seatbacks to allow access to the cargo storage area through the opening in the partition between the passenger area and cargo storage area of a vehicle. It is also known to provide a folding seatback to allow access to areas behind a vehicle seat such as in a sport utility vehicle, van or the like. It is also known to provide a vehicle seat, for example, an automotive seat and a reclinable back.

In a typical configuration, the seatback includes a latch that engages a striker member to secure the seatback in an upright, or design seating position. Such latch assemblies provide a simple and cost effective method for latching the seatback but have inherent issues with freeplay and noise (buzzes, squeaks and rattles (BSR)) created by movement of the latch relative to and against the striker member when the seat is in the design position. Such issues are typically managed by rubber bumpers or plastic overmold components which are included in a seat latch design to dampen motion and noise. These design features are limited in effectiveness because they do not adequately address the relative motion between components within the latch and generate additional design considerations regarding engagement efforts. Rubber bumpers commonly make it more difficult for an operator to latch or unlatch the seatback when moving it from an open position to a closed position or vice versa. Prior art latches have included a single structural camming surface that engages a catch to inhibit movement in the forward direction of the seatback in conjunction with the use of a rubber interference member to inhibit movement in the rearward direction.

Notwithstanding the known latch mechanisms and vehicle seat design application, there remains a significant need to develop a latch for use in a vehicle seatback which is capable of restricting seatback to striker member motion without causing high engagement efforts. There is further need to provide a vehicle seat that minimizes or eliminates noise (BSR) due to the latch catch going in and out of contact with the striker by restricting the movement of the catch in both the forward and rearward directions and keeping the striker member and catch mechanism in contact under high vibration loading.

SUMMARY OF THE INVENTION

In one embodiment of the present invention there is provided a latch for use in a vehicle having a rear seat with a fold down seatback. The latch comprises a latch assembly configured to releasably engage a striker member coupled to the vehicle. The latch assembly comprises a catch plate configured with two prongs and pivotably mounted on a support plate. A hook plate with two camming surfaces is configured to engage at least one of the prongs with the hook plate pivotably mounted on the support plate. The movement of the engaged prong is restricted in any direction when the hook plate is in a locked position. Another embodiment includes an intermediate plate pivotably mounted on the support plate and configured to selectively engage the catch plate and the hook plate. In another embodiment of the latch each prong of the catch plate is overmolded with a polymeric material and aligned to contact the striker member during operation of the seatback latch to provide a more positive engagement between the catch plate and the striker to better eliminate free play and BSR.

There is further provided a seat for a vehicle comprising a seat base coupled to the vehicle and a seatback coupled to the seat base and configured to rotate from a seating position to a stored position. The seatback includes a seatback latch which is coupled to the seatback. The latch comprises a striker member coupled to the vehicle and a latch assembly configured to releasably engage the striker member. The latch assembly comprises a catch plate configured with two prongs and pivotably mounted on a support plate. A hook plate with two camming surfaces is configured to engage at least one of the prongs with the hook plate pivotably mounted on the support plate. The movement of the engaged prong is restricted in any direction when the hook plate is in a locked position. Another embodiment includes an intermediate plate which is pivotably mounted on the support plate and configured to selectively engage the catch plate and hook plate. Each prong is overmolded with a polymeric material and configured to contact the striker member during operation of the seatback latch to prevent buzzes, squeaks and rattles.

DETAILED DESCRIPTION OF EXEMPLARY EMBODIMENTS

Before beginning the detailed description of an exemplary embodiment, several general comments are warranted about the applicability and the scope of the present invention.

First, the illustrations relate to a seat (also can be referred to as a chair) particularly adapted for motor vehicles, such as cars, SUVs, vans, trucks, buses and the like, but the invention is applicable also to seating used in aircraft, railroad vehicles, nautical vehicles or other environments.

Second, the seat of the present invention is illustrated in the FIGURES as a padded seat having certain contours, trim and the like. While this configuration is presently preferred, a wide variety of seat configurations and appearances will benefit from use of the mechanical support and movement mechanisms. Also the exterior of the seat can be covered by fabric, vinyl, leather or other materials known and used in the seating art.

Third, with regard to the seat described later herein, substantial modifications can be made without departing from the invention's intended scope. For example, while certain mechanical systems can be used to move seat components to achieve certain results, other mechanisms, manual or powered could be substituted therefore. For example, where a screw drive is used in moving the thorax pivot location of the seat, other mechanical equivalents including, but not limited to, four bar linkages, air or hydraulic cylinders, air bladders, rack and pinion systems, cams and cables, gears, etc. could be employed. Another example is that for a pelvis support, i.e., a pair of clam-shell like devices (which are themselves already known in the art). They could be replaced by other known or subsequently developed support mechanisms. These mechanisms do not, in and of themselves, form part of the present invention, but when combined with the other pivot, support, rotation and moving mechanisms define the invention and result in more comfortable seating for the occupant.

Figure 1:
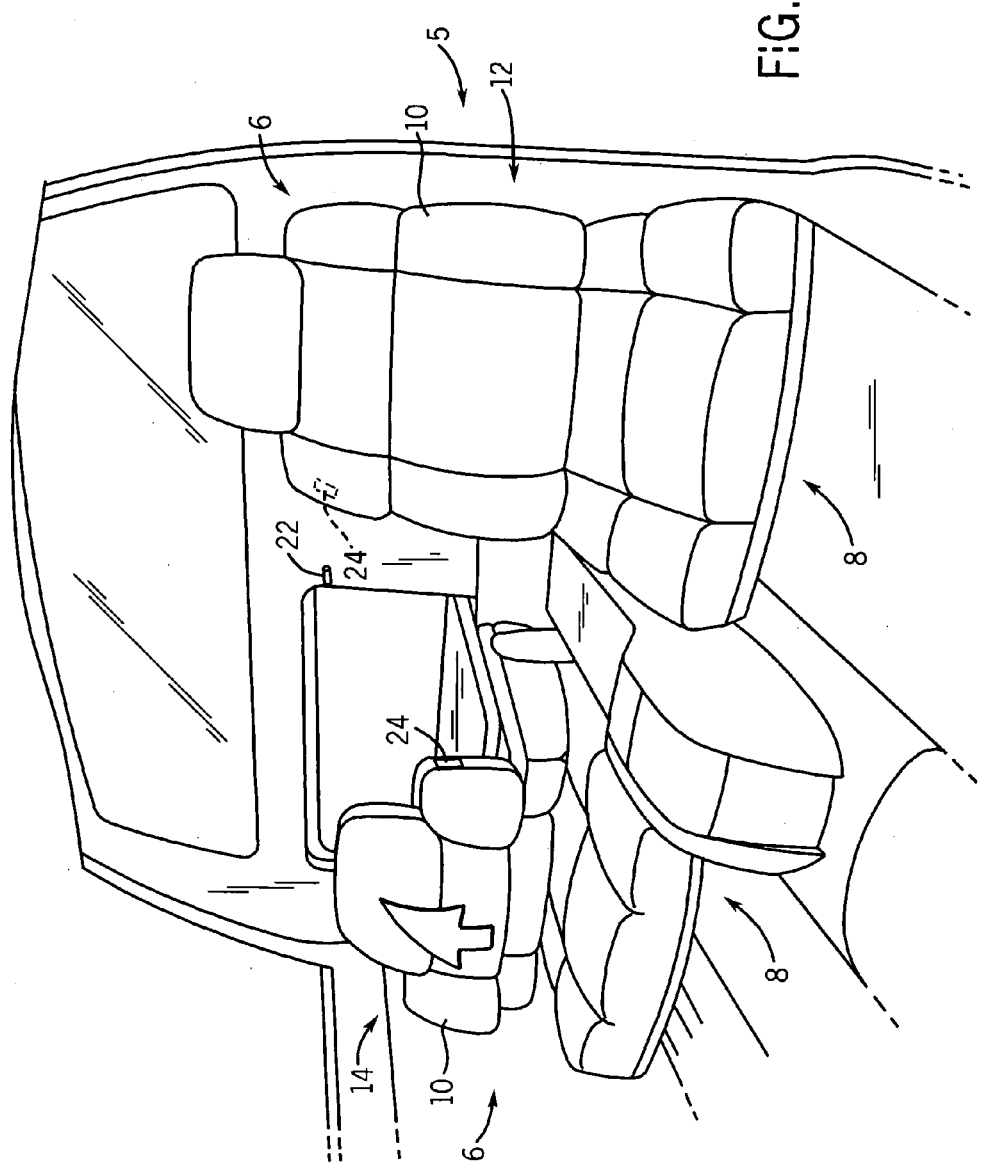
FIG. 1 is an illustration of vehicle seats, one in a seating position (right side) and one in a stored position (left side) including an exemplary embodiment of a seatback latch having a striker member and a latch assembly.

Referring generally to the Figures and in particular to FIG. 1 there is shown a vehicle seat 6 for use in a vehicle 5 of any known type. The vehicle seat 6 includes a seat base 8 which supports a cushioned seat and a seatback 10 pivotally connected to the seat base 8. The seat 6 can be either a manually adjustable seat or may be provided with electric motors to provide automated adjustment and electronic control of the seat. Such manipulation can be accomplished by the use of a change of position mechanism coupled to the seatback 10 and seat base 8. The change of position mechanism provides for the back frame to move in proportional relation to the seat base 8 at a predetermined ratio. The seat 6 is connected to the floor of the support structure of a vehicle 5 in any of a variety of configurations or designs which allow for the movement and adjustment of the seat 6 within the vehicle 5. The vehicle seat 6 may optionally include a headrest which may also be adjustable with respect to an occupant of the seat 6 such as any known or appropriate headrest.

The seatback 10 of the vehicle seat 6 preferably includes a central portion cushion and a pair of side bolsters positioned on the sides of the cushion. The cushion is preferably contoured to receive and support the back of an occupant of the vehicle seat. The side bolsters are also preferably aligned with respect to the cushion and contoured to provide an angled, gradual support of the lateral side portions of an occupant of the vehicle seat 6. The cushion and side bolsters preferably include a foam material and a cover of any appropriate or known material such as cloth, vinyl, leather, etc. The cushion and bolsters typically include support frames.

Figure 2:
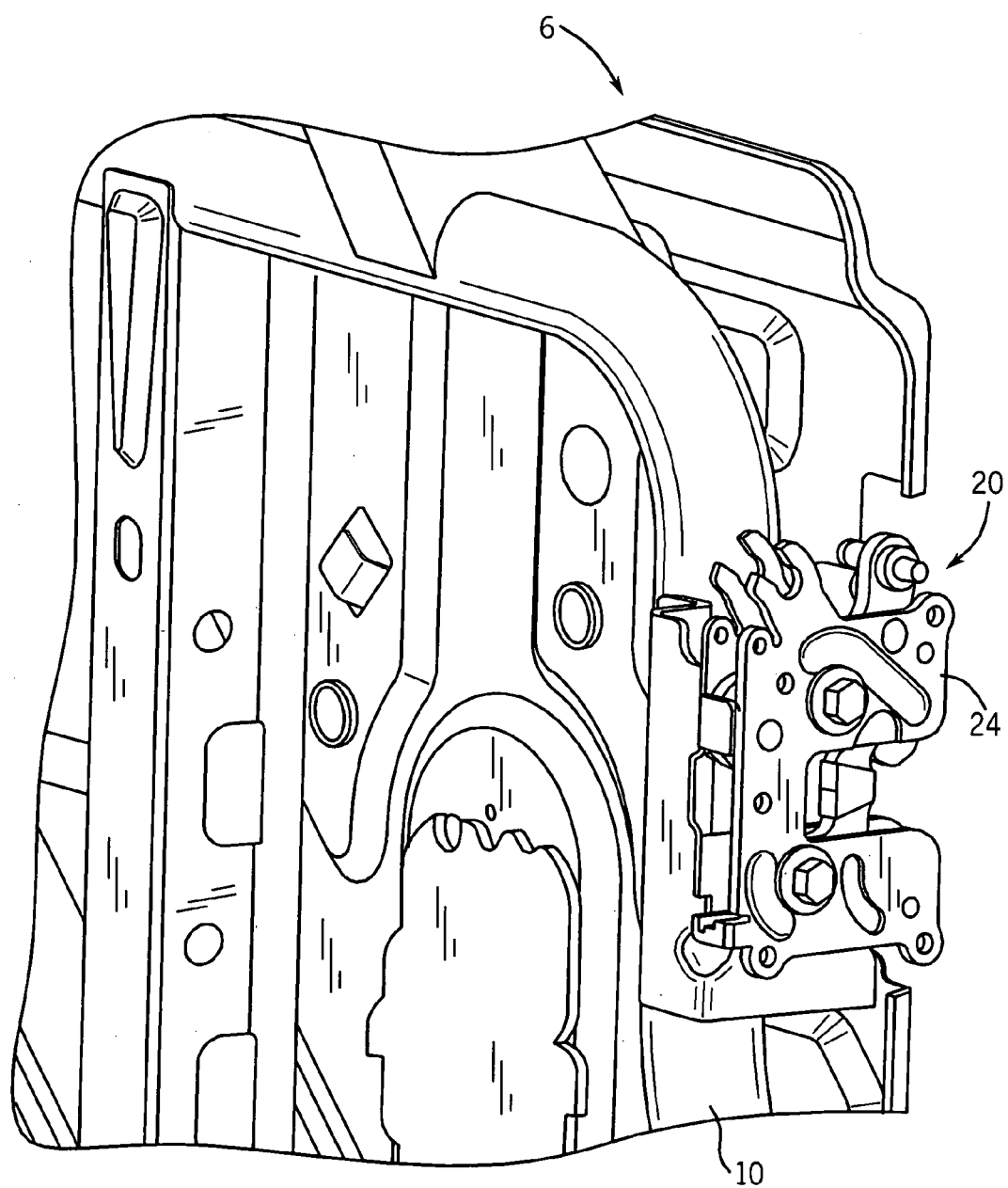
FIG. 2 is a partial perspective view of an exemplary embodiment of a latch assembly of a seatback latch mounted on a seatback of a vehicle seat.

The seatback 10 further includes a back frame including a cover of any appropriate or known material such as cloth, vinyl, leather, etc. and which preferably matches the cover material of the seat, back cushion, side bolsters and seat base 8. However, it should be understood that a different material may be used on any element. FIG. 2 illustrates a frame of a seatback 10 without the covers.

Referring now to the figures, FIG. 1 is a partial perspective illustration of an exemplary embodiment of a vehicle seat 6. FIG. 1 illustrates two vehicle seats 6. The one in the right side of the figure illustrates a seating position of the vehicle seat 6 and the vehicle seat 6 on the left side of the figure illustrates a stored position seat. A console may separate the vehicle seats 6.

A vehicle 5 typically includes a vehicle support structure, for example, a frame chassis. The vehicle 5 may also have a passenger area and a cargo storage area. A partition typically separates the passenger area from the cargo storage area. In a pick-up truck type vehicle 5, the cargo storage area is generally referred to as a cargo box. In a passenger automobile type vehicle 5, the cargo storage area is typically referred to as the trunk. The striker member 22 can be mounted on the partition or any other convenient portion of the vehicle support structure.

A vehicle seat 6 includes a seat base 8 which supports a seat cushion and a seatback 10. A headrest may also be included as well as side bolsters.

It should be noted that the broad arrows in the figures depict the proper motion of the several elements as will be appreciated by one ordinarily skilled in the art.

Figure 3:
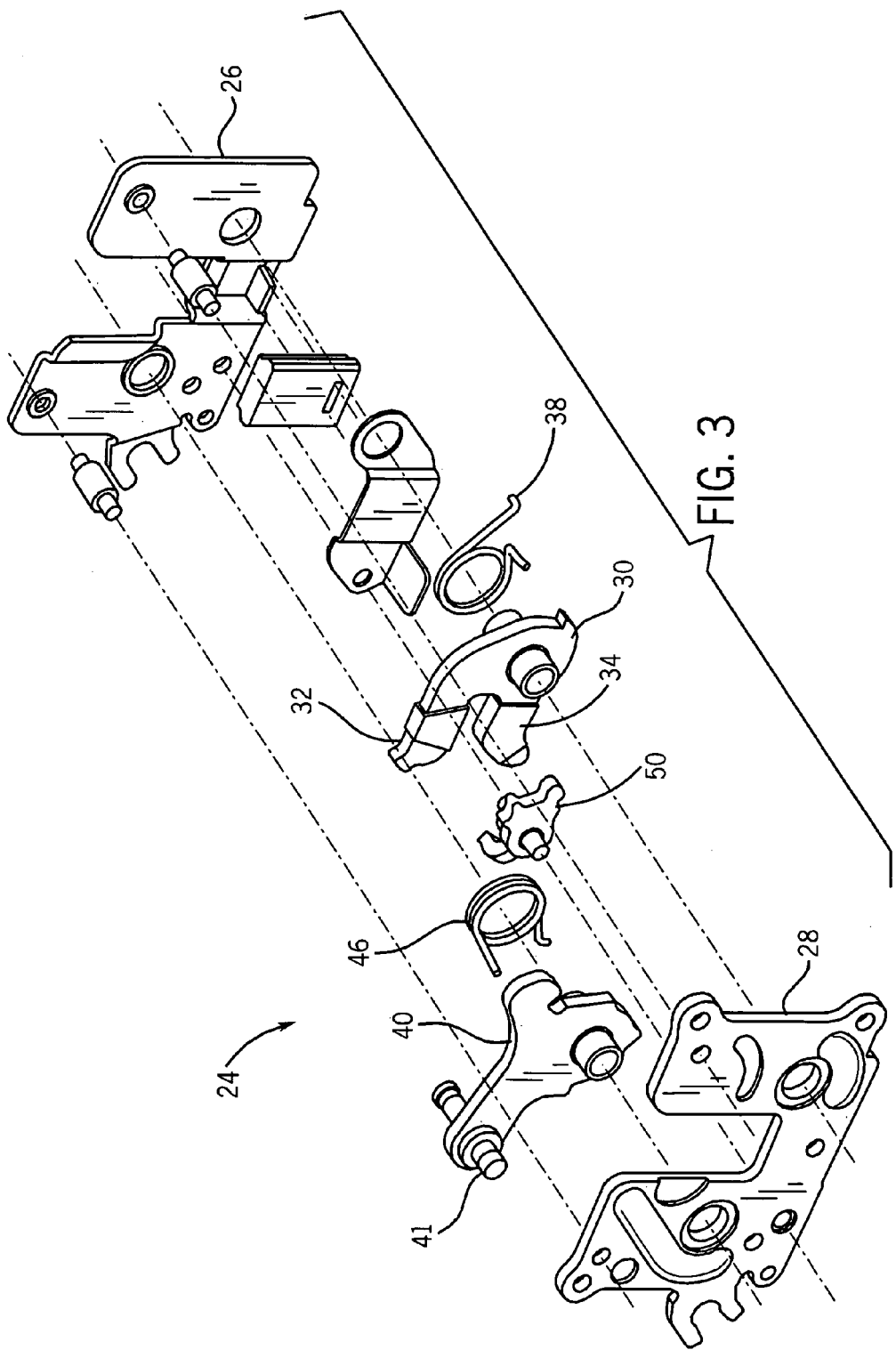
FIG. 3 is an exploded perspective view of the latch assembly illustrated in FIG. 2.

FIG. 3 illustrates an exploded view of an exemplary embodiment of a latch assembly 24. A support plate 26 and a covered plate 28 retain the parts of the latch assembly 24. Rivets or other suitable fastener can be used to assemble the latch assembly 24. A catch plate 30 is configured with two prongs 32, 34 and is pivotably mounted on the support plate 26. The catch plate 30 can be configured with conventional bushing to allow pivoting within the latch assembly 24. A first biasing member 38 is coupled to the catch plate 30 and the support member 26 to provide biasing force on the catch plate 30 during operation of the latch assembly 24. Additional frictional control can be provided by embossed ridges formed in the cover plate 28.

A hook plate 40 with two camming surfaces 42, 44 is configured to engage at least one of the prongs 32, 34 of the catch plate 30. The hook plate 40 is pivotably mounted on the support plate 26. Conventional bushings can be configured to allow smooth movement of the hook plate 40 during operation of the latch assembly 24. A second biasing member 46 is coupled to the hook plate 40 and the support member 26. Additional frictional control can be provided by embossed ridges formed in the cover plate 28.

Figure 4:
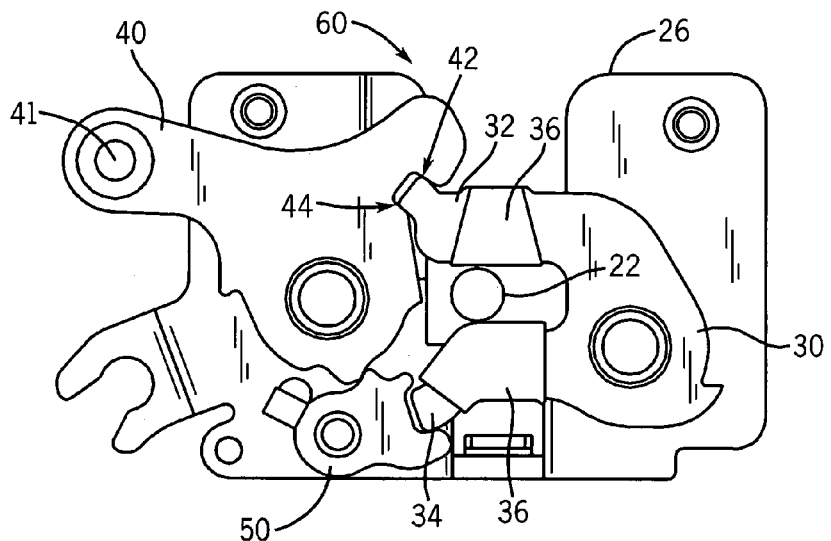
FIGS. 4–9 illustrate the operation of an exemplary embodiment of a seatback latch from a locked position to (FIG. 4) an open position (FIG. 9) and the relative positions of a catch plate, hook plate, intermediate plate and striker member during such operation.
Figure 5:
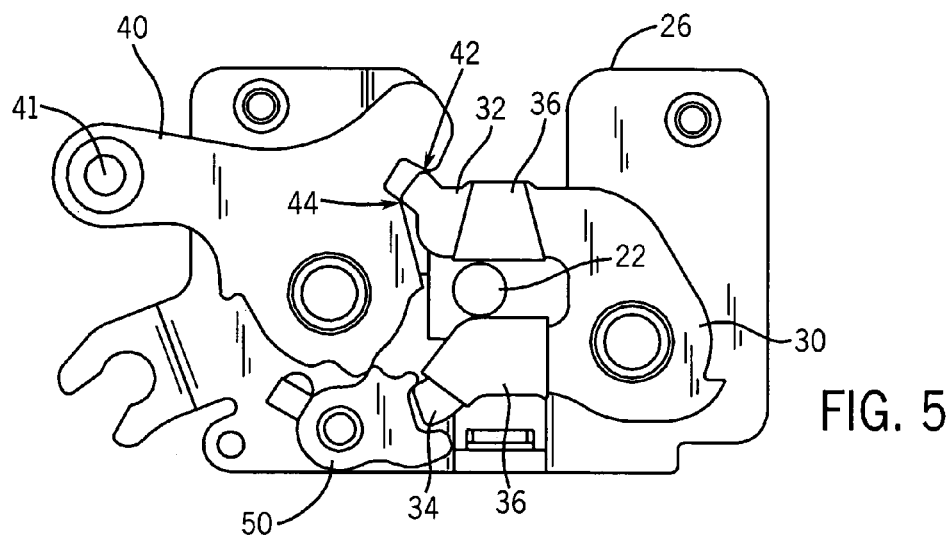
Figure 6:
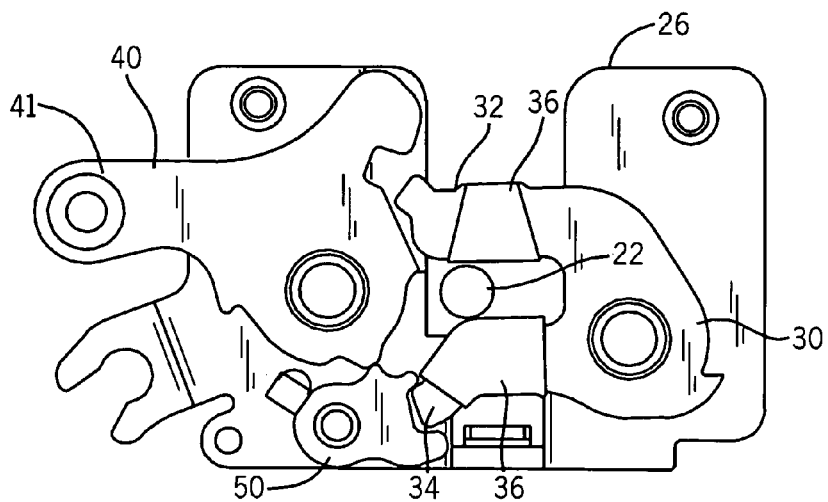
Figure 7:
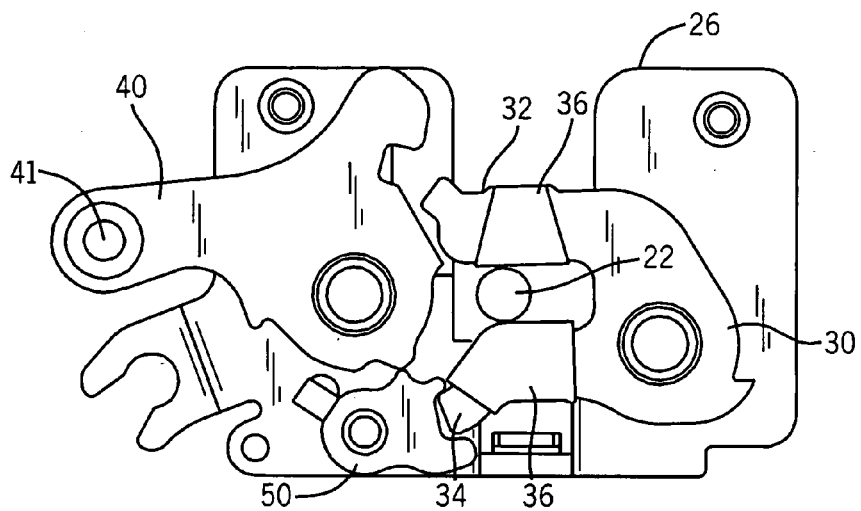
Figure 8:
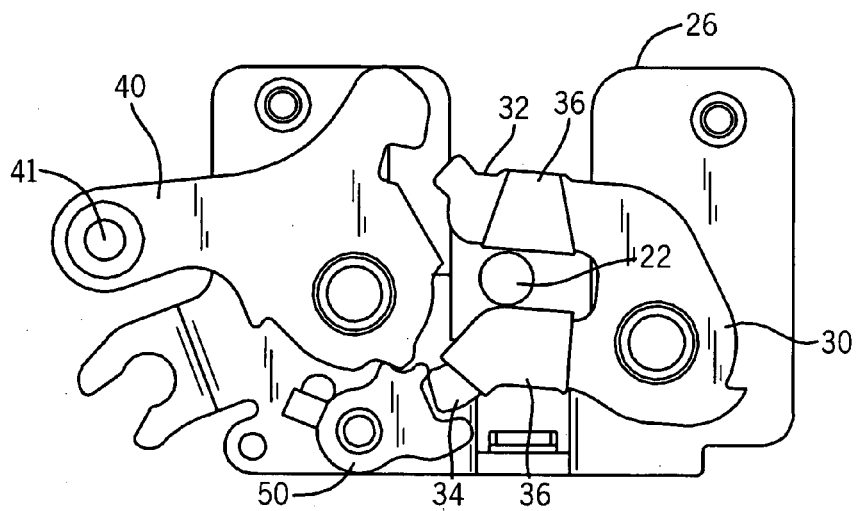

The camming surfaces 42, 44, as illustrated in FIGS. 4–9 are configured to engage one of the prongs 32, 34 (prong 32 is illustrated). The movement of the engaged prong 32 is restricted in any direction when the hook plate 40 is in a locked position 60 as illustrated in FIG. 4. Such double cam to restrict motion of the striker 22 and the catch plate 30 allows operation of the seatbed latch 20 without causing high engagement efforts. Noise due to the striker member 22 and the catch plate 30 going in and out of contact is eliminated by restricting the movement of the catch plate 30 in both directions (forward and backward) relative to the seatback 10 thereby keeping the striker member 22 and the catch plate 30 in contact even under high vibration loading, such as quick stops and starts by the vehicle 5, or traversing uneven (off road) terrain. Additional noise and movement conditions are minimized by the use of an overmold 36 mounted on each prong 32, 34 and aligned to contact the striker member 32 during operation of the seatback latch 20. The overmold 36 can be composed of any suitable material that will provide the desired effects, for example, plastic or rubber or the like.

Figure 9:
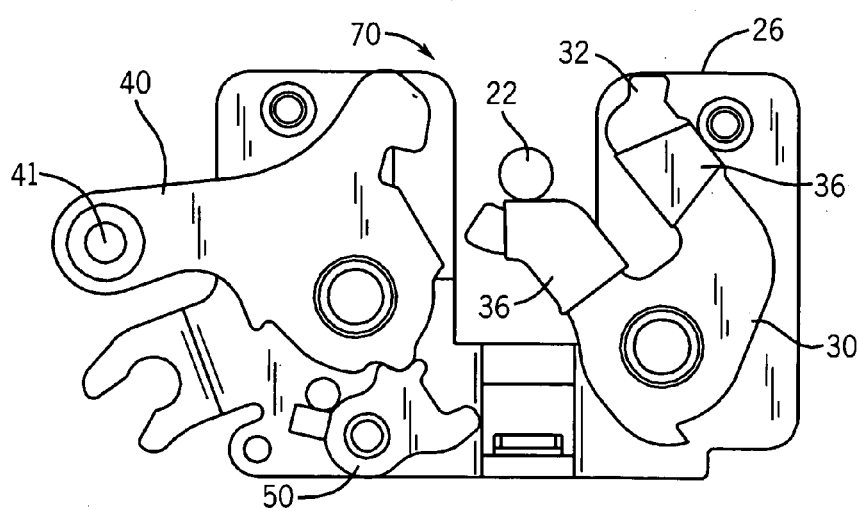

In conjunction with the catch plate 30 and hook plate 40, an intermediate plate 50 can be provided. The intermediate plate 50 is pivotably mounted on the support plate 26 and configured to selectively engage the catch plate 30 and hook plate 40 during the operation of the seatback latch 20. FIGS. 4–9 illustrate several positions of the respective parts of the latch assembly 24 from the fully locked position as illustrated in FIG. 4 through the fully opened position as illustrated in FIG. 9. FIGS. 5–8 illustrate the relative positions and motions of the catch plate 30, hook plate 40 and intermediate plate 50 during operation of the seatback latch 20.

It should be understood that operation of the seatback latch 20 occurs when the seatback 10 is moved from a seating position 12 to a stored position 14 and again when the seatback 10 is moved from the stored position 14 to the seating position 12. Additional camming surfaces can be provided on the hook plate 40, the catch plate 30 and intermediate plate 50 to facilitate operation of the seatback latch 20 as determined by the designer or manufacturer of the seatback latch 20.

An interlock pin 41 can be provided to the hook plate 40 to interface with an interlock associated with the vehicle seat 6.

The striker member 22 can be mounted on the partition described above or any other suitable location on the vehicle 5 and aligned to engage the latch assembly 24 which is typically mounted on the seatback 8. However, it should be understood that the striker member 22 can be mounted on the seatback 10 and the latch assembly 24 mounted and aligned in an associated position on the vehicle 5. The striker member can be formed in the shape of a U or an L or any other suitable configuration to engage the catch plate 30 of the latch assembly 24.

The several described elements can be composed of any suitable material but steel of appropriate composition is the most practical material.

Although the disclosed embodiments have been described in some detail, it should be understood that various changes, substitutions and alterations can be made to the embodiments without departing from their spirit and scope.

What is claimed is:

1. A latch for use in a vehicle having a rear seat with a fold-down seatback, the latch comprising:
   a latch assembly configured to releaseably engage a striker member coupled to the vehicle, the latch assembly comprising:
   a catch plate configured with two prongs and pivotally mounted on a support plate;
   a hook plate with two camming surfaces configured to engage at least one of the prongs with the hook plate pivotally mounted on the support plate; and
   an intermediate plate pivotally mounted on the support plate and configured to selectively engage the catch plate and the hook plate, wherein movement of the engaged prong is restricted in any direction when the hook plate is in a locked position.

2. The latch of claim 1, wherein the latch assembly is coupled to the seatback.

3. The latch of claim 1, including an overmold mounted on each prong and aligned to contact the striker member during operation of the seatback latch to provide a positive engagement between the catch plate and the striker to minimize free play and buzzes, squeaks and rattles.

4. The latch of claim 3, wherein the overmold is composed of plastic.

5. The latch of claim 1, including a first biasing member coupled to the catch plate and support plate.

6. The latch of claim 5, including a second biasing member coupled to the hook plate and support plate.

7. A seat of for a vehicle, the seat comprising:
   a seat base coupled to the vehicle;
   a seatback coupled to the seat base and configured to rotate from a seating position to a stored position; and
   a latch coupled to the seatback, the latch comprising:
   a striker member coupled to the vehicle; and
   a latch assembly configured to releaseably engage the striker member, the latch assembly comprising:
   a catch plate configured with two prongs and pivotally mounted on a support plate;
   a hook plate with two camming surfaces configured to engage at least one of the prongs with the hook plate pivotally mounted on the support plate; and
   an intermediate plate pivotally mounted on the support plate and configured to selectively engage the catch plate and hook plate, wherein movement of the engaged prong is restricted in any direction when the hook plate is in a locked position.

8. The seat of claim 7, wherein the latch assembly is coupled to the seatback.

9. The seat of claim 7, including an overmold mounted on each prong and configured to contact the striker member during operation of the latch to prevent buzzes, squeaks and rattles.

10. The seat latch of claim 9, wherein the overmold is composed of plastic.

11. The seat latch of claim 7, including a first biasing member coupled to the catch plate and support plate.

12. The seat latch of claim 11, including a second biasing member coupled to the hook plate and support plate.

* * * * *

UNITED STATES PATENT AND TRADEMARK OFFICE
CERTIFICATE OF CORRECTION

PATENT NO. : 6,908,137 B2  
DATED : June 21, 2005  
INVENTOR(S) : Kyle Doxey, Changwei Xie and Shawn Brewer It is certified that error appears in the above-identified patent and that said Letters Patent is hereby corrected as shown below:

Column 6,  
Line 10, delete "of".

Signed and Sealed this

Twenty-fifth Day of October, 2005

JON W. DUDAS  
*Director of the United States Patent and Trademark Office*